United States Patent Office 3,134,811
Patented May 26, 1964

3,134,811
AMINOPHENYL HYDROQUINONES
Myron S. Simon, Newton Center, Mass., assignor to Polaroid Corporation, Cambridge, Mass., a corporation of Delaware
No Drawing. Filed May 21, 1962, Ser. No. 196,463
5 Claims. (Cl. 260—571)

This invention relates to chemistry and more particularly to novel chemical compounds.

This application is in part a continuation of my co-pending application Serial No. 612,053, filed September 25, 1956 (now abandoned).

One object of this invention is to provide novel amino-arylene-substituted-dihydroxybenzene compounds, and, more particularly, aminophenyl-hydroquinones.

Another object of this invention is to provide novel derivatives of such amino-arylene-substituted-dihydroxybenzenes and, more particularly, O-acyl derivatives thereof.

Another object of this invention is to provide processes for preparing these compounds.

Other objects of the invention will in part be obvious and will in part appear hereinafter.

The invention accordingly comprises the products possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds of this invention may be represented by the formula:

$$Z_n-Ar-Y$$
$$|$$
$$NH_2$$

wherein Ar is a divalent aryl nucleus, such as a benzene or naphthalene nucleus; each Z is an alkyl group, preferably a lower alkyl group such as methyl or ethyl, an alkoxy group, preferably a lower alkoxy group such as methoxy, or halogen, such as chlorine; $n$ is 0, 1 or 2; and Y is an ortho-dihydroxyphenyl, a para-dihydroxyphenyl, an ortho-O,O'-bis-acyloxyphenyl or a para-O,O'-bis-acyloxyphenyl group, which group may be substituted by alkyl groups, preferably lower alkyl, or by halogen, e.g., chlorine and bromine. By the term "acyloxy" is meant the grouping R—COO—, wherein R is an aliphatic group, preferably containing one to five carbons. In the preferred embodiment, R contains one carbon, and the acyloxy group is an acetoxy group.

These compounds are preferably in the form of acid addition salts, such as the hydrohalide, e.g., the hydrochloride. If the compound is to be stored for any length of time, it is preferable to keep it in the form of the salt, e.g., hydrochloride, to prevent shifting of an acyl group from a hydroxyl group to the amino group.

In the preferred embodiment, the aryl nucleus X is a benzene nucleus, and such compounds may be represented by the formula:

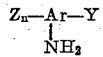

wherein Z and $n$ have the same meaning as above, and Y is preferably p-dihydroxyphenyl or p-O,O'-bis-acetoxyphenyl.

The preferred compounds of this invention are:

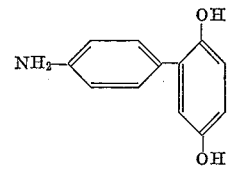
p-aminophenyl-hydroquinone

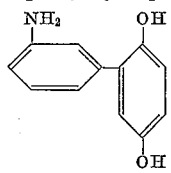
m-aminophenyl-hydroquinone

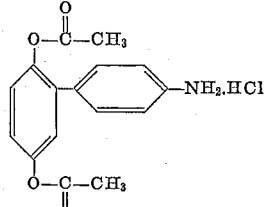
p-aminophenyl-hydroquinone-O,O'-diacetate hydrochloride

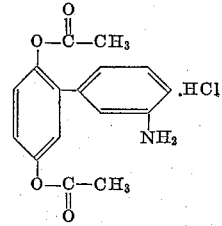
m-aminophenyl-hydroquinone-O,O'-diacetate hydrochloride

As examples of other compounds within the scope of this invention, mention may be made of:

2-(p-aminophenyl)-5-methyl-hydroquinone
2-(p-aminophenyl)-5-chloro hydroquinone
2-(3'-methyl-4'-aminophenyl)-hydroquinone
2-(p-aminophenyl)-5,6-dimethyl-hydroquinone
2-(4'-aminonaphthyl)-hydroquinone
2-(m-aminophenyl)-5-methyl-hydroquinone
2-(4'-amino-3'-methoxy-phenyl)-hydroquinone
2-(p-aminophenyl)-6-methyl-hydroquinone
2-(p-aminophenyl)-5-bromo-hydroquinone
2-(4'-amino-2',5'-dimethoxy-phenyl)-hydroquinone
2-(4'-amino-2'-chloro-phenyl)-hydroquinone
2-(4'-amino-2'-methyl-phenyl)-hydroquinone
2-(o-aminophenyl)-hydroquinone
2-(p-aminophenyl)-5-methyl-hydroquinone-O,O'-diacetate
2-(p-aminophenyl)-5-chloro-hydroquinone-O,O'-diacetate
2-(3'-methyl-4'-aminophenyl)-hydroquinone-O,O'-diacetate
2-(p-aminophenyl)-5,6-dimethyl-hydroquinone-O,O'-diacetate 2-(4'-aminonaphthyl)-hydroquinone-O,O'-diacetate
2-(m-aminophenyl)-5-methyl-hydroquinone-O,O'-diacetate
2-(4'-amino-3'-methoxy-phenyl)-hydroquinone-O,O'-diacetate
2-(p-aminophenyl)-6-methyl-hydroquinone-O,O'-diacetate
2-(p-aminophenyl)-5-bromo-hydroquinone-O,O'-diacetate
2-(4'-amino-2',5'-dimethoxy-phenyl)-hydroquinone-O,O'-diacetate
2-(4'-amino-2'-chloro-phenyl)-hydroquinone-O,O'-diacetate
2-(4'-amino-2'-methyl-phenyl)-hydroquinone-O,O'-diacetate
2-(o-aminophenyl)-hydroquinone-O,O'-diacetate One general method of preparing compounds within the scope of this invention utilizes the Meerwein arylation reaction, in which benzoquinone or an alkyl or halogen substituted benzoquinone is reacted with the appropriate diazotized nitroaniline or nitronaphthylamine. The resulting nitroarylbenzoquinone product is reduced and hydroquinonyl hydroxyl groups acylated.

An alternative method of preparing compounds within the scope of this invention is to react the desired diazotized nitroaniline or nitronaphthyl amine with, e.g., hydroquinone, followed by reduction to the desired amino product. The hydroquinonyl hydroxyl groups may be acylated before or after reduction of the nitro group.

The following examples illustrate the preparation of compounds within the scope of this invention and are given for purposes of illustration only.

*Example 1*

27.6 g. of p-nitroaniline was dissolved in a hot solution of 60 cc. of water and 60 cc. of concentrated hydrochloric acid, and poured, with stirring, onto 500 g. of ice and 100 cc. of water in a flask shielded from light. A solution of 14 g. of sodium nitrite in 56 cc. of water was added rapidly below the surface of the suspension. 10 N sodium hydroxide solution was added until the solution was still acid but no longer turned Congo Red paper blue. The reaction mixture was filtered into a funnel shielded from light, and added dropwise, at 10° C., to 24.2 g. of hydroquinone dissolved in 120 cc. of water. The resulting solution was stirred for an hour and then filtered. The precipitate was dissolved in 300 cc. of alcohol and precipitated into a salt and ice mixture to yield 29 g. of 2-(p-nitrophenyl)-hydroquinone as a light yellow precipitate, M.P. 214–220° C. Recrystallization from xylene raised the melting point to 219–221.5° C.

27.4 g. of 2-(p-nitrophenyl)-hydroquinone in 250 cc. of acetic anhydride and 2 cc. of sulfuric acid was heated on a steam bath for one half hour, and then poured onto excess ice. The mixture was stirred and slowly warmed on a steam bath until the excess anhydride was all decomposed. Water was added to completely precipitate the oil. The mixture was cooled in ice to crystallize the oil. After filtering, the precipitate was recrystallized from ethanol two times to give 13.4 g. of the diacetate, M.P. 114–116° C.

A solution of 13 g. of 2-(p-nitrophenyl)-hydroquinone-O,O'-diacetate in 130 cc. of ethyl acetate containing 6 g. of Raney nickel catalyst was hydrogenated at 32 p.s.i. overnight. The solvent was evaporated and the residue taken up in benzene and then precipitated with HCl. The precipitate was recrystallized from ethanol-ether to yield 9.9 g. of 2-(p-aminophenyl)-hydroquinone-O,O'-diacetate as tan glistening needles.

*Example 2*

The procedure of Example 1 was repeated, except that the reduction step was carried out as follows: 12.0 g. of 2-(p-nitrophenyl)-hydroquinone-O,O'-diacetate in 120 cc. of ethyl acetate containing 2 cc. of Raney nickel catalyst was hydrogenated at 88° C. for 5.5 hours, the initial hydrogen pressure being 19.5 p.s.i. The reaction mixture was filtered through Cellite and alumina to obtain a clear yellow oil. This oil was washed three times with hexane, then covered with water and concentrated HCl added slowly with stirring. A white crystalline paste of the hydrochloride formed and was filtered to yield 8.3 g. Evaporation of the mother liquor yielded 0.4 g. additional product.

*Example 3*

80 cc. of concentrated HCl was added slowly to a stirred suspension of 27.6 g. of m-nitroaniline in 200 cc. of water, and the mixture warmed on a steam bath. The resulting slurry of the hydrochloride was rapidly cooled to 0–5° C., and to this was added dropwise a solution of 13.8 g. of sodium nitrite in 25 cc. of water. Stirring was continued for one hour at 0–5° C., filtered and added all at once to a stirred suspension of 25.9 g. of purified benzoquinone in an aqueous solution of sodium acetate (100 g. sodium acetate in 1200 cc. water/ice mixture containing a small amount of antifoam agent) at a temperature below 15° C. The reaction mixture was stirred for 6 hours or overnight at room temperature, and the solid filtered, washed with water, and dried to yield 2-(m-nitrophenyl)-benzoquinone as a light brown powder, M.P. 106–109° C.

45 g. of 2-(m-nitrophenyl)-benzoquinone was placed in a hydrogenation flask with 500 cc. of ethanol and 1.4 g. of 10% palladium on charcoal catalyst. Hydrogenation was effected at room temperature, the theoretical amount of hydrogen being consumed within 4 hours. The hydrogenation product was isolated by filtration through Cellite and evaporation of the solvent under vacuum.

The resulting 2-(m-aminophenyl)-hydroquinone (0.2 mole) was placed in a flask with 750 cc. of glacial acetic acid that had been presaturated with HCl gas. The resulting solution was stirred for 15 minutes with HCl gas continuously bubbled into the flask. Acetyl chloride (117 g.) was added dropwise with stirring. A warm water bath (45–40° C.) was placed under the reaction flask for 1 hour. The light brown solid which separated was filtered, washed, and dried in vacuum to yield 2-(m-aminophenyl)-hydroquinone-O,O'-diacetate hydrochloride.

The novel dihydroxyphenyl compounds of this invention are useful as photographic silver halide developing agents, and are also useful as anti-oxidants in petroleum products, etc.

It will be noted that the bis-acylated nitroaryl-dihydroxybenzene intermediates, e.g., 2-(p-nitrophenyl)-hydroquinone-O,O'-diacetate, also are novel compounds.

The novel acyl compounds of this invention are highly useful chemical intermediates. They are especially useful in reactions wherein it is desired that reaction be restricted to the amino group, and also where it is desired that the hydroxyl groups be protected during reaction and yet be readily regenerated after the reaction is completed.

In particular, the novel acyl compounds of this invention are highly useful as intermediates in the preparation of azo compounds. It is well known that free hydroquinone groups will rapidly reduce diazonium salts. Thus it is practically impossible to diazotize an amino compound in the presence of a hydroquinone group. The novel compounds of this invention, however, may be readily diazotized and thus are highly valuable in the preparation of azo compounds, as, for example, in the preparation of azo compounds as disclosed and claimed in my copending application Serial No. 612,053, filed September 25, 1956 (now abandoned), of which this application is a continuation-in-part, and in my copending applications, Serial No. 196,523 and Serial No. 196,524, both filed May 21, 1962, also as continuations-in-part of said Serial No. 612,053.

Since certain changes may be made in the above products without departing from the scope of the invention herein involved, it is intended that all matter contained in the above description shall be interpreted as illustrative and not in a limiting sense.

What is claimed is:

1. Compounds selected from the group consisting of compounds within the formula:

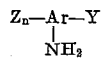

wherein each Z is selected from the group consisting of alkyl, alkoxy and chloro groups, $n$ is an integer from 0 to 2, inclusive, Ar is selected from the group consisting of benzene and naphthalene nuclei, and Y is selected from the group consisting of unsubstituted, alkyl-substituted, chloro-substituted, and bromo-substituted o-dihydroxyphenyl and p-dihydroxyphenyl groups.

2. Hydrohalide salts of the compounds defined in claim 1.
3. 2-(p-aminophenyl)-hydroquinone.
4. 2-(m-aminophenyl)-hydroquinone.
5. 2-(o-aminophenyl)-hydroquinone.

References Cited in the file of this patent

UNITED STATES PATENTS 3,019,107 Blout et al. _____ Jan. 30, 1962

OTHER REFERENCES

Dobas: "Chemical Abstracts," vol. 47, page 8669 (1953).